United States Patent [19]

Claar et al.

[11] Patent Number: 5,299,621
[45] Date of Patent: Apr. 5, 1994

[54] METHOD OF PRODUCING CERAMIC COMPOSITE BODIES

[75] Inventors: Terry D. Claar, Newark; Gerhard H. Schiroky, Hockessin, both of Del.; Donald P. Ripa, North East, Md.; William B. Johnson, Newark, Del.

[73] Assignee: Lanxide Technology Company, LP, Newark, Del.

[21] Appl. No.: 762,163

[22] Filed: Sep. 19, 1991

Related U.S. Application Data

[63] Continuation of Ser. No. 296,770, Jan. 13, 1989, abandoned.

[51] Int. Cl.$^5$ .................................................. B22D 19/00
[52] U.S. Cl. .......................................... 164/98; 264/86
[58] Field of Search ............... 264/86; 164/98, 108, 164/112

[56] References Cited

U.S. PATENT DOCUMENTS

| | | | |
|---|---|---|---|
| 3,364,152 | 1/1968 | Lipp | 252/478 |
| 3,758,662 | 9/1973 | Tobin | 264/332 |
| 3,864,154 | 2/1975 | Gazza et al. | 29/123 B |
| 4,353,714 | 10/1982 | Lee et al. | 419/57 X |
| 4,471,059 | 9/1984 | Yoshino et al. | 501/96 |
| 4,492,670 | 1/1985 | Mizrah | 419/9 |
| 4,544,524 | 10/1985 | Mizrah | 419/9 |
| 4,585,618 | 4/1989 | Fresnel | 419/12 |
| 4,595,545 | 6/1986 | Sane | 264/65 |
| 4,605,440 | 8/1986 | Halverson | 74/238 |
| 4,692,418 | 9/1987 | Boecker et al. | 501/90 |
| 4,702,770 | 10/1987 | Pyzik | 74/236 |
| 4,713,360 | 12/1987 | Newkirk et al. | 501/87 |
| 4,718,941 | 1/1988 | Halverson | 75/236 |
| 4,777,014 | 10/1988 | Newkirk et al. | 419/12 |
| 4,793,968 | 12/1988 | Mosser et al. | 419/17 X |
| 4,818,454 | 4/1989 | Urquhart et al. | 264/59 |
| 4,824,622 | 4/1989 | Kennedy et al. | 264/59 |
| 4,830,799 | 5/1989 | LaRoche | 264/60 |
| 4,834,925 | 5/1989 | LaRoche, Jr. | 264/60 |
| 4,834,938 | 5/1989 | Pyzik et al. | 419/6 |
| 4,885,130 | 12/1989 | Claar et al. | 419/12 |
| 4,885,131 | 12/1989 | Newkirk | 419/12 |
| 4,891,338 | 1/1990 | Gesing | 501/87 |
| 4,915,736 | 4/1990 | Claar et al. | 75/244 |
| 4,923,832 | 5/1990 | Newkirk et al. | 501/128 |
| 4,940,679 | 7/1990 | Claar et al. | 501/96 |
| 4,986,945 | 1/1991 | LaRoche, Jr. | 264/60 |
| 5,000,892 | 3/1991 | LaRoche, Jr. et al. | 264/59 |
| 5,000,894 | 3/1991 | LaRoche, Jr. | 264/59 |
| 5,010,044 | 4/1991 | Newkirk | 501/93 |
| 5,017,334 | 5/1991 | Claar et al. | 419/12 |
| 5,017,526 | 5/1991 | Newkirk et al. | 501/89 |
| 5,019,539 | 5/1991 | Claar et al. | 501/87 |
| 5,024,795 | 6/1991 | Kennedy et al. | 264/59 |

FOREIGN PATENT DOCUMENTS

| | | |
|---|---|---|
| 0165707 | 12/1985 | European Pat. Off. |
| 0193292 | 9/1986 | European Pat. Off. |
| 0239520 | 9/1987 | European Pat. Off. |
| 1492477 | 11/1977 | United Kingdom |

*Primary Examiner*—James Derrington
*Attorney, Agent, or Firm*—Mark G. Mortenson; Jeffrey R. Ramberg

[57] ABSTRACT

This invention relates generally to a novel method of preparing self-supporting bodies, and novel products made thereby. In its more specific aspects, this invention relates to a method for producing self-supporting bodies comprising one or more boron-containing compounds, e.g., a boride or a boride and a carbide, by reactive infiltration of molten parent metal into a preform comprising boron carbide or a boron donor material combined with a carbon donor material and, optionally, one or more inert fillers, to form the body. Specifically, a boron carbide material or combination of a boron donor material and a carbon donor material, and in either case, optionally, one or more inert fillers, are sedimentation cast, slip cast or pressed onto or into a body and into a particular desired shape.

22 Claims, 3 Drawing Sheets ness, easily induced, catastrophic
METHOD OF PRODUCING CERAMIC COMPOSITE BODIES This is a continuation of copending application Ser. No. 07/296,770, filed on Jan. 13, 1989, now abandoned.

FIELD OF THE INVENTION

This invention relates generally to a novel method of preparing self-supporting bodies, and novel products made thereby. In its more specific aspects, this invention relates to a method for producing self-supporting bodies comprising one or more boron-containing compounds, e.g., a boride or a boride and a carbide, by reactive infiltration of molten parent metal into a preform comprising boron carbide or a boron donor material combined with a carbon donor material and, optionally, one or more inert fillers, to form the body. Specifically, a boron carbide material or combination of a boron donor material and a carbon donor material, and in either case, optionally, one or more inert fillers, are sedimentation cast, slip cast, or isostatically pressed onto a body into a particular desired shape, or formed into a preform having a particular desired shape, and the material is subsequently reactively infiltrated with a molten parent metal.

BACKGROUND OF THE PRESENT INVENTION

In recent years, there has been an increasing interest in the use of ceramics for structural applications historically served by metals. The impetus for this interest has been the relative superiority of ceramics, when compared to metals, with respect to certain properties, such as corrosion resistance, hardness, wear resistance, modulus of elasticity and refractory capabilities.

However, a major limitation on the use of ceramics for such purposes is the feasibility and cost of producing the desired ceramic structures. For example, the production of ceramic boride bodies by the methods of hot pressing, reaction sintering, and reaction hot pressing is well known. While there has been some limited success in producing ceramic boride bodies according to the above-discussed methods, there is still a need for a more effective and economical method to prepare dense boride-containing materials.

In addition, a second major limitation on the use of ceramics for structural applications is that ceramics generally exhibit a lack of toughness (i.e., damage tolerance, or resistance to fracture). Such lack of toughness tends to result in sudden, easily induced, catastrophic failure of ceramics in applications involving rather moderate tensile stresses. This lack of toughness tends to be particularly common in monolithic ceramic boride bodies.

One approach to overcome the above-discussed problem has been the attempt to use ceramics in combination with metals, for example, as cermets or metal matrix composites. The objective of this known approach is to obtain a combination of the best properties of the ceramic (e.g., hardness and/or stiffness) and the best properties of the metal (e.g., ductility). While there has been some general success in the cermet area in the production of boride compounds, there still remains a need for more effective and economical methods to prepare dense boride-containing materials.

DISCUSSION OF RELATED PATENTS AND PATENT APPLICATIONS

Many of the above-discussed problems associated with the production of boride-containing materials have been addressed in U.S. patent application Ser. No. 073,533, filed in the names of Danny R. White, Michael K. Aghajanian and T. Dennis Claar, on Jul. 15, 1987, and now abandoned, and entitled "Process for Preparing Self-Supporting Bodies and Products Made Thereby".

The following definitions were used in Application '533 and shall apply to the instant application as well.

"Parent metal" refers to that metal (e.g., zirconium) which is the precursor for the polycrystalline oxidation reaction product, that is, the parent metal boride or other parent metal boron compound, and includes that metal as a pure or relatively pure metal, a commercially available metal having impurities and/or alloying constituents therein, and an alloy in which that metal precursor is the major constituent; and when a specific metal is mentioned as the parent metal (e.g. zirconium), the metal identified should be read with this definition in mind unless indicated otherwise by the context.

"Parent metal boride" and "parent metal boro compounds" mean a reaction product containing boron formed upon reaction between boron carbide and the parent metal and includes a binary compound of boron with the parent metal as well as ternary or higher order compounds.

"Parent metal carbide" means a reaction product containing carbon formed upon reaction of boron carbide and parent metal.

Briefly summarizing the disclosure of Application '533, self-supporting ceramic bodies are produced by utilizing a parent metal infiltration and reaction process (i.e., reactive infiltration) in the presence of a boron carbide. Particularly, a bed or mass of boron carbide is infiltrated by molten parent metal, and the bed may be comprised entirely of boron carbide, thus resulting in a self-supporting body comprising one or more parent metal boron-containing compounds, which compounds include a parent metal boride or a parent metal boro carbide, or both, and typically also may include a parent metal carbide. It is also disclosed that the mass of boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of Application '533, a mass comprising boron carbide is placed adjacent to or in contact with a body of molten metal or metal alloy, which is melted in a substantially inert environment within a particular temperature envelope. The molten metal infiltrates the boron carbide mass and reacts with the boron carbide to form at least one reaction product. The boron carbide is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted boron carbide by a wicking or a capillary action. This transported metal forms additional parent metal boride, carbide, and/or boro carbide and the formation or development of a ceramic body is continued until either the parent metal or boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in Application '533, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the boron carbide body, the relative amounts of boron carbide and parent metal, alloys of the parent metal, dilution of the boron carbide with a filler, temperature, and time. Preferably, conversion of the boron carbide to the parent metal boride, parent metal boro compound(s) and parent metal carbide is at least about 50%, and most preferably at least about 90%.

The typical environment or atmosphere which was utilized in Application '533 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

U.S. patent application Ser. No. 137,044, now U.S. Pat. No. 4,940,679, which issued on Jul. 10, 1990, (hereinafter referred to as Patent '679), filed in the names of Terry Dennis Claar, Steven Michael Mason, Kevin Peter Pochopien and Danny Ray White, on Dec. 23, 1987, and entitled "Process for Preparing Self-Supporting Bodies and Products Made Thereby", was a continuation-in-part application of Application '533. Patent '679 discloses that in some cases it may be desirable to add a carbon donor material (i.e., a carbon-containing compound) to the bed or mass of boron carbide which is to be infiltrated by molten parent metal. Specifically, it was disclosed that the carbon donor material could be capable of reacting with the parent metal to form a parent metal-carbide phase which could modify resultant mechanical properties of the composite body, relative to a composite body which was produced without the use of a carbon donor material. Accordingly, it was disclosed that reactant concentrations and process conditions could be altered or controlled to yield a body containing varying volume percents of ceramic compounds, metal and/or porosity. For example, by adding a carbon donor material (e.g., graphite powder or carbon black) to the mass of boron carbide, the ratio of parent metal-boride/parent metal-carbide could be adjusted. In particular, if zirconium was used as the parent metal, the ratio of $ZrB_2/ZrC$ could be reduced (i.e., more ZrC could be produced due to the addition of a carbon donor material in the mass of boron carbide).

Patent '679 also discloses the use of a graphite mold which contains an appropriate number of through-holes having a particular size, shape and location which function as a venting means to permit the removal of, for example, any gas which may be trapped in the preform or filler material as the parent metal reactive infiltration front infiltrates the preform.

In another related application, specifically, U.S. patent application Ser. No. 137,382, now U.S. Pat. No. 4,915,736 (hereinafter referred to as Patent '736), filed in the names of Terry Dennis Claar and Gerhard Hans Schiroky, on Dec. 23, 1987, and entitled "A Method of Modifying Ceramic Composite Bodies By a Carburization Process and Articles Made Thereby", additional modification techniques are disclosed. Specifically, Patent '736 discloses that a ceramic composite body made in accordance with the teachings of Application '533 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, Patent '736 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5–30 volume percent, such composite body could be modified by a post-carburization treatment to result in from about 0 to about 2 volume percent, typically about ½ to about 2 volume percent, of parent metal remaining in the composite body.

The disclosures of each of the above-discussed Commonly Owned U.S. Patents and Patent applications is herein expressly incorporated by reference.

SUMMARY OF THE INVENTION

The present invention has been developed in view of the foregoing to overcome the deficiencies of the prior art.

The present invention relates to sedimentation casting or slip casting, in a first preferred embodiment, boron carbide onto or into a porous graphite mold. Specifically, the boron carbide can be cast around a porous graphite mold so that an interior portion of the boron carbide replicates the exterior surface of the porous graphite mold. Alternatively, boron carbide may be sedimentation cast or slip cast into a porous graphite mold containing a cavity. In this manner, the cast boron carbide corresponds to an interior portion of the porous graphite mold. In either of the above two embodiments, the boron carbide is reactively infiltrated by molten parent metal which will result in a self-supporting body comprising one or more parent metal boron-containing compounds, which compounds include a parent metal boride or a parent metal boro carbide, or both, and typically also may include a parent metal carbide. In addition, the mass to be infiltrated may contain one or more inert filler materials admixed with the boron carbide to produce a composite by reactive infiltration, which composite comprises a matrix of one or more boron-containing compounds and also may include a parent metal carbide.

Upon reaction of the parent metal with the boron carbide, the resulting self-supporting body will correspond substantially to the shape of the boron carbide which has been slip cast or sediment cast onto or into the porous graphite mold.

Alternatively, rather than utilizing a boron carbide material which is sedimentation cast or slip cast, a mixture of a boron-donor material (i.e., a boron-containing compound) and a carbon donor material (i.e., a carbon-containing compound), can be mixed in any desired molar ratio and slip cast or sediment cast in a procedure similar to that discussed above for boron carbide.

DETAILED DESCRIPTION OF THE INVENTION AND PREFERRED EMBODIMENTS

Figure 1:
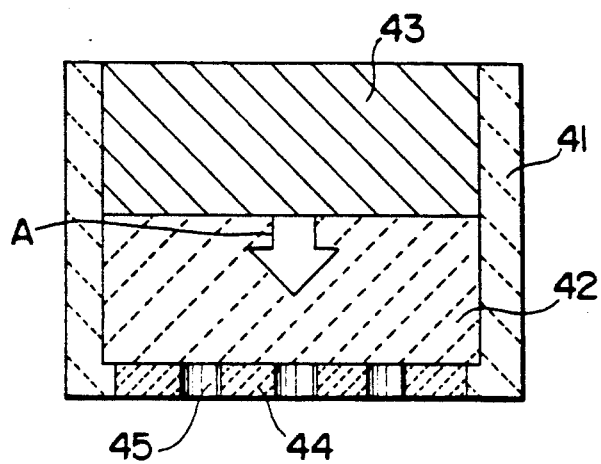
FIG. 1 is a cross-sectional view of a setup utilized to form the self-supporting bodies of the present invention.

In accordance with the invention, a self-supporting body is produced by the reactive infiltration of a molten parent metal with boron carbide to form a polycrystalline ceramic-containing body comprising the reaction product(s) of the parent metal with boron carbide, and also may include one or more constituents of the parent metal. The boron carbide, typically a solid at the process conditions, is preferably in fine particulate or powdered form. The environment or atmosphere for the process is chosen to be relatively inert or nonreactive under the process conditions. Argon or vacuum, for example, would be suitable process atmospheres. The resulting product comprises one or more of (a) a parent metal boride, (b) a boro compound, (c) usually a parent metal carbide, and (d) metal. The constituents and proportions in the product depend largely on the choice and composition of parent metal and the reaction conditions. Also, the self-supporting body produced may exhibit porosity or voids.

In the preferred embodiments of the present invention, the parent metal and a preform of boron carbide are positioned adjacent each other so that reactive infiltration will be in the direction towards and into the preform. The preform, which may be slip cast, sedimentation cast or pressed, may include a filler material, such as a reinforcing filler, which is substantially inert under the process conditions. The reaction product can grow into the preform without substantially disturbing or displacing it. Thus, no external forces are required which might damage or disturb the arrangement of the preform and no awkward or costly high temperature, high pressure processes and facilities are required to create the reaction product. Reactive infiltration of the parent metal into and with the boron carbide, which preferably is in particulate or powdered form, forms a composite typically comprising a parent metal boride and a parent metal boro compound. With aluminum as the parent metal, the product may comprise an aluminum boro carbide (e.g. $Al_3B_{48}C_2$, $AlB_{12}C_2$, $AlB_{24}C_4$), and also may include metal, e.g. aluminum, and possibly other unreacted or unoxidized constituents of the parent metal. If zirconium is the parent metal, the resulting composite comprises zirconium boride and zirconium carbide. Also, zirconium metal may be present in the composite.

Although the present invention is hereinafter described with particular reference to certain preferred embodiments in which the parent metal is zirconium or aluminum, this is for illustrative purposes only. Other parent metals also may be used such as silicon, titanium, hafnium, lanthanum, iron, calcium, vanadium, niobium, tantalum, tungsten, magnesium, chromium, molybedenum, zirconium and beryllium, and examples for several such parent metals are given below.

In the method of the present invention, the parent metal and the preformed boron carbide are placed in contact with each other, usually within an inert container, and this assembly, comprising the inert container and its contents, is placed in a furnace and heated, preferably in an inert atmosphere such as argon, above the melting point of the parent metal but preferably below the melting point of the desired reaction product so as to form a body or pool of molten metal. It should be understood that the operable temperature range or preferred temperature may not extend over this entire interval. The temperature range will depend largely upon such factors as the composition of the parent metal and the desired phases in the resulting composite. Molten metal contacts the boron carbide, and a parent metal boride (e.g. zirconium diboride) and/or a parent metal carbide (e.g., zirconium carbide) are formed as the reaction product. Upon continued exposure to the boron carbide, the remaining molten metal is progressively drawn through the reaction product in the direction of and into the preform containing the boron carbide, to provide continued formation of reaction product at the interface between the molten metal and boron carbide. The product produced by this method comprises the reaction product(s) of the parent metal with the boron carbide, or may comprise a ceramic-metal composite to include further one or more unreacted or non-oxidized constituents of the parent metal. A substantial amount of the boron carbide is reacted to form the reaction product(s), preferably this amount being at least about 50% and most preferably at least about 90%. The ceramic crystallites formed as the reaction product by the process may or may not be interconnected, but preferably are interconnected in three dimensions, and the metallic phases and any voids in the product are normally at least partially interconnected. Any porosity tends to result from a partial or nearly complete depletion of the parent metallic phase in favor of the formation of additional reaction product (as in the case where stoichiometric reactants or excess boron carbide is present), but the volume percent of voids will depend on such factors as temperature, time, type of parent metal, and the porosity of the preform containing the boron carbide.

It has been observed that products made in accordance with this invention using zirconium, titanium and hafnium as the parent metal form a parent metal boride characterized by a platelet-like structure. This platelet-like structure and the metallic phase appear to account at least in large part for the extraordinarily high fracture toughness of this composite, about 12 mega Pascals meters$^{\frac{1}{2}}$ or higher, because of crack deflection and/or pull-out mechanisms.

In another aspect of the invention, there is provided a self-supporting body, including composite bodies, comprising a matrix of reaction product, and, optionally metallic constituents, embedding a substantially inert filler. The matrix is formed by the reactive infiltration of a parent metal into a preform of the filler intimately mixed with boron carbide. The filler material may be of any size or shape, and may be oriented with respect to the parent metal in any manner as long as the direction of development of the reaction product will be towards and will engulf at least a portion of the filler material without substantially disturbing or displacing it. The filler may be composed of or comprise any suitable material, such as ceramic and/or metal fibers, whiskers, particulates, powders, rods, wires, wire cloth, refractory cloth, plates, platelets, reticulated foam structure, solid or hollow spheres, etc. A particularly useful filler is alumina, but other oxides and ceramic fillers may be used depending on the starting materials and the end properties desired. Further, the filler material may be homogeneous or heterogeneous. The filler materials may be bonded with any suitable binding agent (e.g. Avicil PH 105, from FMC Co.) which does not interfere with the reactions of this invention or leave any undesirable residual by-products within the final composite product. A filler which would tend to react excessively with the boron carbide or with the molten metal during processing may be coated so as to render the filler inert to the process environment. For example, carbon fiber, if used as a filler in conjunction with aluminum as the parent metal will tend to react with molten aluminum, but this reaction can be avoided if the fiber is first coated, e.g. with alumina.

Figure 2:
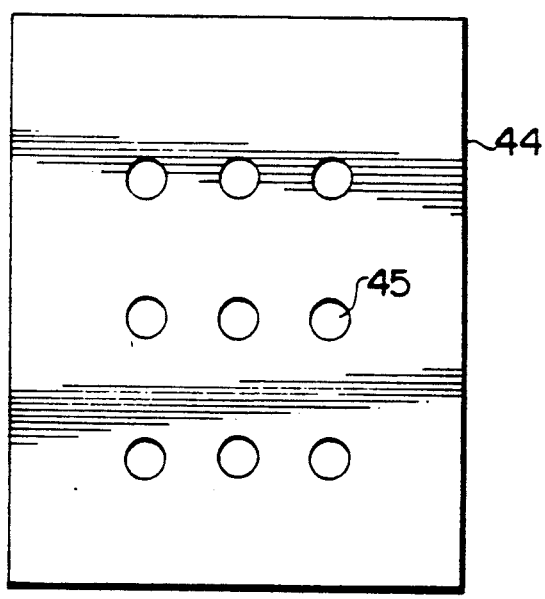
FIG. 2 is a frontal view of a bottom portion of a graphite refractory vessel having a plurality of through holes.

A suitable refractory container holding the parent metal and a preform of filler with admixed boron carbide properly oriented to permit reactive infiltration of the parent metal into the preform and proper development of the composite, is placed in a furnace, and this lay-up is heated to a temperature above the melting point of the parent metal. At these elevated temperatures, the molten parent metal infiltrates the preform by a wicking process and reacts with the boron carbide, thereby producing the desired ceramic or ceramic-metal composite body. Moreover, to assist in reducing the amount of final machining and finishing operations, a barrier material can surround the preform. The use of a graphite mold or mandrel is particularly useful as a barrier for such parent metals as zirconium, titanium, or hafnium, when used in combination with preforms made of, for example, boron carbide, boron nitride, boron and carbon. Still further, by placing an appropriate number of through-holes having a particular size and shape in the aforementioned graphite mold, or mandrel, the amount of porosity which typically occurs within a composite body manufactured according to the present invention, is reduced. Typically, a plurality of holes is placed in a bottom portion of the mold, or that portion of the mold or mandrel toward which reactive infiltration occurs. The holes function as a venting means which permit the removal of, for example, argon gas which has been trapped in the preform as the parent metal reactive infiltration front infiltrates the preform. FIG. 1 shows a preform 42 in contact with a parent metal ingot 43 both of which are contained in a graphite refractory vessel 41. The graphite refractory vessel 41 has a bottom portion 44 having therein a plurality of through-holes 45 which function as a venting means. FIG. 2 shows the bottom portion of the graphite refractory vessel 41 having a plurality of through holes 45. The through-holes 45 permit any gas trapped in the preform (e.g., argon escape as the parent metal reactive infiltration front infiltrates the preform (i.e., the reactive infiltration front penetrates the preform in the direction of the arrow "A" in FIG. 1). Thus, porosity in the formed composite body can be reduced.

Figure 3:
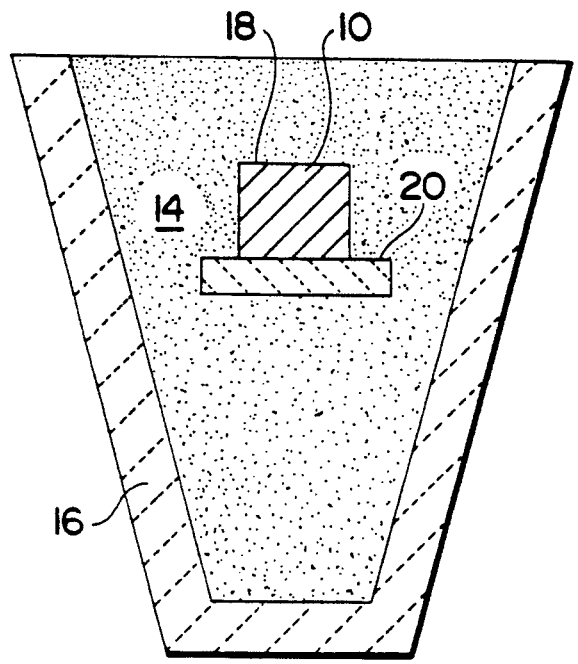
FIG. 3 is a cross-sectional view of a setup utilized to produce the self-supporting bodies of the present invention.

A composite made by practicing this invention is illustrated in FIG. 3. The boron carbide, together with any desired inert filler materials, is fabricated into a preform with a shape corresponding to the desired geometry of the final composite. The preform 20 is superimposed with the parent metal precursor 10 and the assembly is surrounded by the inert material 14 contained within the crucible 16. The top surface 18 of the parent metal may or may not be exposed. The preform 20 may be prepared by any of a wide range of conventional ceramic body formation methods (such as uniaxial pressing, isostatic pressing, slip casting, sedimentation casting, tape casting, injection molding, filament winding for fibrous materials, etc.) depending on the characteristics of the filler. Initial bonding of the filler particles, whiskers, fibers, or the like, prior to reactive infiltration may be obtained through light sintering or by use of various organic or inorganic binder materials which do not interfere with the process or contribute undesirable by-products to the finished material. The preform 20 is manufactured to have sufficient shape integrity and green strength, and should be permeable to the transport of molten metal, preferably having a porosity of between about 5 and 90% by volume and more preferably between about 25 and 75% by volume. In the case of an aluminum parent metal, suitable filler materials include, for example, silicon carbide, titanium diboride, alumina and aluminum dodecaboride (among others), and as particulates typically having a mesh size of from about 14 to 1000, but any admixture of filler materials and mesh sizes may be used. The preform 20 is then contacted with molten parent metal on one or more of its surfaces for a time sufficient to complete infiltration of the matrix to the surface boundaries of the preform. The result of this preform method is a ceramic-metal composite body of a shape closely or exactly representing that desired in the final product, thus minimizing or eliminating expensive final machining or grinding operations.

It has been discovered that infiltration of the permeable preform by the parent metal is promoted by the presence of boron carbide in the preform. A small amount of boron source has been shown to be effective, but the minimum can depend upon a number of factors such as type and particle size of the boron carbide, type of parent metal, type of filler, and process conditions. Thus, a wide variation of boron carbide concentrations can be provided in the filler, but the lower the concentration of boron carbide, the higher the volume percent of metal in the matrix. When very low amounts of the boron carbide are used, e.g. one to three weight percent based on the total weight of boron carbide plus filler, the resulting matrix is interconnected metal and a limited amount of parent metal boride and parent metal carbide dispersed in the metal. In the absence of boron carbide, reactive infiltration of the filler may not occur, and infiltration may not be possible without special procedures, such as the application of external pressure to force the metal into the filler.

Because a wide range of boron carbide concentrations in the filler can be used in the process of this invention, it is possible to control or to modify the properties of the completed product by varying the concentration of boron carbide and/or the composition of the preform. When only a small amount of boron carbide is present relative to the amount of parent metal, such that the preform comprises a low density of boron carbide, the composite body or matrix properties are dominated by the properties of the parent metal, most typically ductility and toughness, because the matrix is predominately metal. Such a product may be advantageous for low or mid-range temperature applications. When a large amount of boron carbide is used, as for example when compound(s) having boron carbide particles are densely packed around a filler material or occupy a high percentage of space between constituents of the filler, the resulting body or matrix properties tend to be dominated by the parent metal boride and any parent metal carbide, in that the body or matrix would be harder or less ductile or less tough. If the stoichiometry is closely controlled so as to achieve substantially complete conversion of the parent metal, the resulting product will contain little or no metal, which may be advantageous for high temperature applications of the product. Also, the substantially complete conversion of the parent metal could be significant especially in some high temperature applications, because the boride reaction product is more stable than boron carbide in that boron carbide will tend to react with residual or unoxidized metal, e.g. aluminum, present in the product. Where desired, elemental carbon may be admixed with the boron carbide preform or preform containing boron carbide and a filler. This excess carbon, typically varying from about 5 to 10 weight percent of the total bedding, reacts with the parent metal thereby assuring substantially complete reaction of the metal. This reaction of the metal with the carbon will depend largely on the relative amount of carbon used, the type, e.g. carbon black or graphite, and crystallinity. Selection among these extreme characteristics may be highly desirable to meet the needs of different potential applications for these products. For example, by adding about 5-75, preferably about 5-50, percent by weight of carbon black to a $B_4C$ preform and reactively infiltrating the preform with a zirconium metal, the ratio of $ZrB_2/ZrC$ can be lowered (i.e., more ZrC is formed).

Also, elemental boron may be admixed with the boron carbide preform (including a preform with filler) to facilitate reactive infiltration, particularly when using aluminum as the parent metal. Such an admixture reduces the cost of the preform relative to all boron carbide, results in the formation of a product containing a boro carbide such as aluminum boro carbide which possesses certain properties comparable to aluminum boride, and prevents the formation of aluminum carbide which is unstable in the presence of moisture and therefore degrades the structural properties of the product. In the admixture, the parent metal reacts with the elemental boron preferentially to form a metal boride, but the boro compound is formed as well.

Additional variations in the characteristics and properties of the composite can be created by controlling the infiltration conditions. Variables which can be manipulated include the nature and size of the particles of boron carbide material, and the temperature and time of infiltration. For example, reactive infiltration involving large boron carbide particles and minimum exposure times at low temperatures will result in a partial conversion of the boron carbide to parent metal boron and parent metal carbon compound(s). As a consequence, unreacted boron carbide material remains in the microstructure, which may impart desirable properties to the finished material for some purposes. Infiltration involving the boron carbide particles, high temperatures and prolonged exposure times (perhaps even to hold at temperature after infiltration is complete) will tend to favor substantially complete conversion of the parent metal to the parent metal boride and carbon compound(s). Preferably, conversion of the boron carbide to the parent metal boride, parent metal boro compound(s) and parent metal carbide is at least about 50%, and most preferably at least about 90%. Infiltration at high temperatures (or a subsequent high temperature treatment) also may result in densification of some of the composite constituents by a sintering process. In addition, as noted previously, the reduction of the amount of available parent metal below that necessary to form the boron and carbon compound(s) and fill the resulting interstices in the material may result in a porous body which also could have useful applications. In such a composite, porosity may vary from about 1 to 25 volume percent, and sometimes higher, depending upon the several factors or conditions enumerated above.

In a preferred embodiment of the present invention, a layer of boron carbide containing material is isopressed onto a graphite mandrel and then reactively infiltrated by a parent metal. The resultant body comprises the reactively infiltrated boron carbide layer having a cavity which inversely replicates the surface geometry of the graphite rod, which is removed after the reactive infiltration process.

In another preferred embodiment of the present invention, a slurry of boron carbide containing material is sedimentation cast, or otherwise applied, to a graphite mandrel having protrusions which may extend either part way or all the way through the preform. After reactively infiltrating the preform with a molten parent metal, the resultant self-supporting body will inversely replicate the surface geometry of the graphite mandrel. This procedure can be utilized to form shaped bodies having intricate surface geometries and/or through holes.

In a preferred embodiment of the present invention wherein a slurry, such as that described in the examples, is applied to a porous mold or mandrel having raised edges, so that the preform contacts at least two of such edges, the present invention allows the production of self-supporting bodies having a more accurate surface replication than previously discussed methods. Applicants believe that this improvement is due to the ability of the preforms formed by the methods discussed in this application to mold themselves to surfaces and resist shrinkage tendencies upon drying. Thus, the preforms maintain contact with the mold or mandrel and accordingly, prevent metal seepage around the sides of the preform which can lead to poor shape replication and/or porosity in the final product along the edges of the preform which were in contact with the mold or mandrel.

Another embodiment of the present invention utilizes a shaped body of parent metal which is coated with a preformed layer of boron carbide. The parent metal reactively infiltrates the boron carbide and leaves behind a cavity which inversely replicates the outer surface geometry of the shaped body of parent metal. A barrier layer (such as a graphite body) can be used on the outside of the boron carbide layer to limit or define the exterior geometry of the final self-supporting body.

The following Examples illustrate the novel reaction products of this invention and the method by which they are prepared; however, these Examples are illustrative only and they are not intended to limit the invention claimed.

EXAMPLE 1

This example demonstrates a technique whereby sediment cast preforms containing boron carbide are reactively infiltrated by zirconium parent metal.

A preform comprising boron carbide was sediment cast into an ATJ graphite crucible having inner dimensions of approximately 2 inches×2 inches×2 inches. The preform was formed by mixing approximately 2 grams of Dow experimental binder 40303.00 with 200 grams of 1000 mesh boron carbide (lot M10-D ESK) and 300 grams of methylene chloride. These components were mixed by the procedure described in the following sentences. In a ½ gallon size Nalgene jug, 300 grams of methylene chloride and 2 grams of Dow experimental binder 40303.00 were mixed until the binder was dissolved and in solution. At this point, approximately 200 grams of 1000 mesh boron carbide (ESK lot M10-D) was slowly stirred into the solution with a stainless steel spatula until the boron carbide was absorbed by the solution and no longer agglomerated.

The slurry was poured into the crucible and allowed to dry overnight. After drying, the slurry had formed an approximately 1.25 inch thick preform which filled the bottom of the crucible with no apparent gaps between the edges of the preform and the walls of the crucible.

After the preform had dried overnight, the crucible containing the preform was placed within a retort furnace at room temperature. The furnace was then evacuated to $1\times10^{-4}$ torr and backfilled with argon gas. After repeating this evacuation/backfill procedure three times, the furnace temperature was raised from room temperature to 350° C. in two hours; from 350° to 450° C. at 10° C. per hour; from 450° to 600° C. at 50° C. per hour; and held at 600° C. for one hour before cooling to room temperature in two hours. This procedure allows the binder to be burned off without affecting the structure of the preform.

After the binder was burned off, approximately 495.5 grams of zirconium sponge (lot 1015) was placed within the graphite crucible on top of the preform. The assembly, consisting of the graphite crucible and its contents was placed within a resistance heated vacuum furnace at room temperature. The furnace was then evacuated to $1\times10^{-4}$ torr and backfilled with argon. After the evacuation/backfill procedure had been performed twice, the furnace temperature was raised from room temperature to 350° C. in two hours; from 350° C. to 600° C. at 50° C. per hour; from 600° to 1900° C. in two hours; and held at 1900° C. for two hours before cooling to room temperature in one hour.

Figure 4:
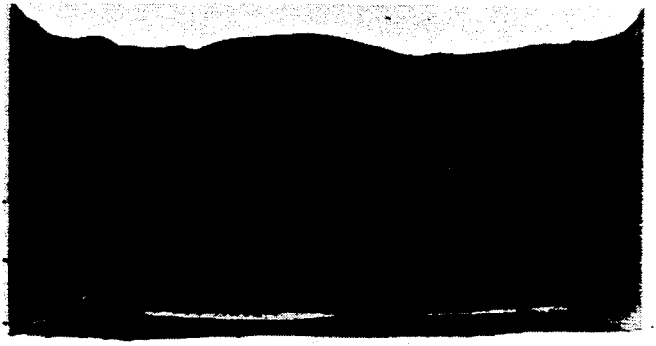
FIG. 4 is a cross-sectional view of the self-supporting body produced in Example 1.

Examination of the assembly after removal from the furnace indicated that the zirconium parent metal had reactively infiltrated the boron carbide preform to form a self-supporting body. FIG. 4 is a photograph which shows a cross-section of the self-supporting body produced in this Example. As illustrated in the Figure, the body has a dense structure with little or no void space or porosity at the edges which were in contact with the crucible walls.

EXAMPLE 2

The procedure discussed above was repeated with a preform having an approximate thickness of 0.38 inches and prepared from a slurry comprising 1 gram of Dow experimental binder 40303.00, 200 grams of 1000 mesh boron carbide (lot M10-D ESK) and 300 grams of methylene chloride. The binder burnout step was performed in the same resistance heated vacuum furnace utilized for the infiltration step in this Example.

Figure 5:
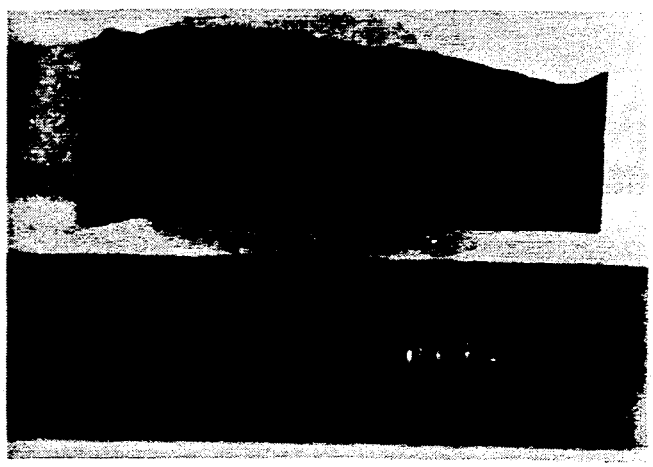
FIG. 5 is a cross-sectional view of the self-supporting body produced in Example 2.

After the binder had been burned off, an approximately 223 gram ingot of commercially available Grade 702 zirconium having approximate dimensions of 1.98 inches×1.98 inches×0.525 inches, was placed within the crucible on top of the preform. The assembly, consisting of the graphite crucible and its contents was subjected to the same heating schedule outlined in Example 1. An examination of the assembly, after it had been removed from the furnace, indicated that the zirconium parent metal had reactively infiltrated the boron carbide preform. FIG. 5 is a photograph of a cross-section of the self-supporting body formed in this Example. Although the body contains some porosity, as illustrated in the Figure, the porosity is not located at the edges of the body which were in contact with the crucible.

EXAMPLE 3

The following example demonstrates a technique whereby a boron carbide slurry is isopressed on the outside of a graphite rod and reactively infiltrated with zirconium parent metal to permit the formation of a tube comprising the reaction product of the zirconium parent metal with the boron carbide and having a hollow core which inversely replicates the outer surface geometry of the graphite rod.

An isopress slurry was prepared by dissolving 10 parts of Dow experimental binder 40303.00 and 30 parts by weight carbowax 8000 in 1500 parts by weight methylene chloride (J. T. Taylor). When all of the carbowax 8000 and binder were dissolved in the methylene chloride, 1000 parts by weight boron carbide (500 mesh ESK lot A-87) was added and the resultant mixture was ball milled for 1.5 hours. After the ball milling, the mixture was poured into an aluminum foil container and allowed to sit until most of the methylene chloride had evaporated. The resultant semidry mixture was sieved through a metallic screen in order to break up any large agglomerates. The sieved mixture was allowed to dry to remove excess methylene chloride and then sieved through 20 mesh screen. The weight loss on drying at 110° C. for two hours should be approximately 7.75% of the total weight of the mixture. In any event, the mixture should have a consistency so that it will stick to the graphite rod upon isopressing to approximately 5000 psi.

Figure 6:
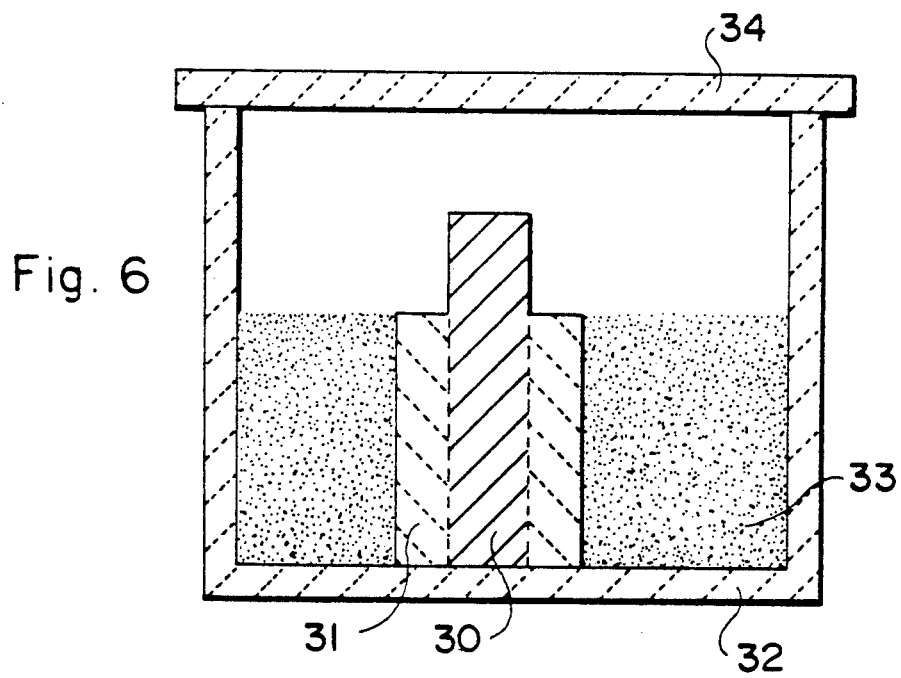
FIG. 6 is a cross-sectional view of the setup utilized to produce the body in Example 3.

As shown in FIG. 6, a graphite rod 30 having an outer diameter of approximately 1 inch was coated with an isopressed layer of boron carbide 31 such that the outer diameter of the coated rod was approximately 1.6 inches. The isopressed boron carbide layer 31 was formed by isopressing the mixture described in the previous paragraph onto the outside of the graphite rod.

The coated graphite rod was cemented to the bottom of an ATJ graphite crucible 32 having an inner diameter of approximately 2.5 inches. The interior of the graphite crucible 32 was then filled with Western zirconium nuclear sponge (No. 15432) until the zirconium sponge 33 was approximately level with the top of the coated region of the graphite rod 30. A graphite cover 34 was placed on top of the graphite crucible 32 and the assembly, as illustrated in FIG. 6, was placed within a resistance heated vacuum furnace at room temperature. The furnace was then evacuated to approximately $1 \times 10^{-4}$ torr and backfilled with argon. After this evacuation/backfill procedure had been performed twice, the furnace temperature was raised from room temperature to 200° C. in two hours; held for one hour at 200° C.; heated from 200° to 350° C. per hour; heated from 350° C. to 450° C. in two hours; heated from 450° C. to 1750° C. in four hours; held for one hour at 1750° C.; heated from 1750° C. to 1900° C. in one hour; and held for two hours at 1900° C. After the two hour heating period at 1900° C., the furnace was turned off and allowed to cool naturally to room temperature. A visual examination of the assembly after removal from the furnace indicated that the zirconium parent metal had infiltrated the isopressed boron carbide layer to the graphite rod. The resultant body produced by the reactive infiltration process was strong and machinable. After removal of the graphite rod, it was noted that the interior of the body produced by the reactive infiltration process had replicated the outer surface of the graphite rod with a high degree of accuracy.

What is claimed is:

1. A method of producing a self-supporting body, comprising:

contacting with a mold having raised edges at least one material in slurry form, such that said at least one material contacts at least two of said edges, said at least one material comprising a material selected from the group consisting of boron carbide, a mixture of boron carbide and a carbon donor material, a mixture of boron carbide and a boron donor material, and a mixture of a boron donor material and a carbon donor material, said contacting comprising at least one process selected from the group consisting of sedimentation casting and slip casting to form a permeable preform;

heating a parent metal in a substantially inert atmosphere to a temperature above its melting point to form a body of molten parent metal;

communicating said body of molten parent metal with said preform;

maintaining said temperature for a time sufficient to permit infiltration of said molten parent metal into said preform and to permit reaction of said molten parent metal with at least a portion of said preform to form at least one boron-containing compound;

maintaining sufficient contact of said preform with said mold during said infiltration so as to prevent seepage of said parent metal between said preform and said mold surface; and continuing said infiltration reaction for a time sufficient to produce said self-supporting body comprising at least one parent metal boron-containing compound.

2. The method of claim 1, wherein said contacting comprises utilizing said at least one process to place said at least one material onto a mold comprising a mandrel.

3. The method of claim 1, wherein said contacting comprises said utilizing said at least one process to provide at least one material into a mold defining an interior cavity which corresponds substantially to the desired shape of said self-supporting body.

4. The method of claim 1, further comprising controlling the molar ratio of said at least one material to said parent metal.

5. The method of claim 4, wherein said controlling forms a self-supporting body possessing properties dominated by a matrix comprising metal.

6. The method of claim 4, wherein said controlling forms a self-supporting body possessing properties dominated by a matrix comprising said at least one parent metal boron-containing compound.

7. The method of claim 1, wherein said preform comprises a filler material.

8. The method of claim 1, wherein said parent metal comprises at least one material selected from the group consisting of Zr, Al, Si, Ti, Hf, La, Fe, Ca, V, Nb, Ta, W, Mg, Cr, Mo, and Be.

9. The method of claim 1, wherein a barrier material is applied to at least a portion of at least one surface of said preform.

10. The method of claim 2, wherein said mandrel comprises graphite.

11. The method of claim 1, wherein said mold comprises graphite.

12. The method of claim 11, wherein a bottom region of said mold defines venting means comprising a plurality of through holes.

13. The method of claim 10, wherein said mandrel possesses at least one protrusion.

14. The method of claim 8, wherein said parent metal comprises a parent metal sponge.

15. The method of claim 1, wherein said metal comprises at least one metal selected from the group consisting of zirconium, titanium and hafnium.

16. The method of claim 1, wherein said self-supporting body further comprises residual unreacted metallic constituents of said parent metal.

17. The method of claim 7, wherein said filler comprises a form selected form the group consisting of fibers, whiskers, particulates, powders, rods, wires, wire cloth, refractory cloth, plates, platelets, reticulated foam structure, solid spheres and hollow spheres.

18. The method of claim 15, wherein said at least one parent metal boron-containing compound comprises a parent metal boride characterized by a platelet-like structure.

19. The method of claim 7, wherein said filler material is provided with a coating so as to render said filler material substantially inert.

20. The method of claim 1, further comprising partially sintering said permeable preform prior to said infiltration and reaction.

21. The method of claim 1, wherein said at least one parent metal boron-containing compound comprises at least one compound selected from the group consisting of a parent metal boride and a parent metal boro compound.

22. The method of claim 1, wherein said self-supporting body further comprises at least one member selected from the group consisting of unreacted boron carbide and a parent metal carbide.

* * * * *